United States Patent
Marur et al.

(10) Patent No.: US 8,498,773 B2
(45) Date of Patent: Jul. 30, 2013

(54) STABILITY ENHANCING SYSTEM AND METHOD FOR ENHANCING THE STABILITY OF A VEHICLE

(75) Inventors: Prabhakar R. Marur, Karnataka (IN); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/784,316

(22) Filed: May 20, 2010

(65) Prior Publication Data

US 2011/0288716 A1    Nov. 24, 2011

(51) Int. Cl.
*G01M 17/00* (2006.01)
*B60G 23/00* (2006.01)
*B60G 17/15* (2006.01)

(52) U.S. Cl.
USPC ......... 701/31.4; 701/37; 280/5.508; 280/754; 280/755

(58) Field of Classification Search
None
See application file for complete search history.

(56) References Cited

U.S. PATENT DOCUMENTS

| | | | | |
|---|---|---|---|---|
| 3,953,040 A * | 4/1976 | Unruh et al. | | 280/6.151 |
| 4,664,408 A * | 5/1987 | Saotome et al. | | 280/124.106 |
| 4,890,823 A * | 1/1990 | Koschinat et al. | | 267/64.27 |
| 5,173,857 A | 12/1992 | Okuyama et al. | | |
| 5,383,680 A | 1/1995 | Bock et al. | | |
| 5,802,980 A * | 9/1998 | Hofmiller | | 105/72.2 |
| 6,247,564 B1 | 6/2001 | Kim | | |
| 6,253,123 B1 * | 6/2001 | Schramm et al. | | 701/1 |
| 6,263,261 B1 * | 7/2001 | Brown et al. | | 701/1 |
| 6,349,247 B1 * | 2/2002 | Schramm et al. | | 701/1 |
| 6,604,745 B2 * | 8/2003 | Piech | | 280/5.502 |
| 6,619,672 B2 | 9/2003 | Charaudeau et al. | | |
| 6,711,482 B2 | 3/2004 | Shiino et al. | | |
| 6,904,351 B1 * | 6/2005 | Hac | | 701/70 |
| 7,003,389 B2 * | 2/2006 | Lu et al. | | 701/70 |
| 7,029,014 B2 | 4/2006 | Hamm | | |

(Continued)

FOREIGN PATENT DOCUMENTS

| | | |
|---|---|---|
| CN | 201140660 Y | 10/2008 |
| DE | 10334034 B3 | 10/2004 |
| DE | 602005005534 T2 | 5/2009 |
| WO | 02068228 A1 | 9/2002 |

OTHER PUBLICATIONS

German Patent Office, German Office Action dated Jan. 25, 2012 for German Patent Application No. 102011101642.6.

(Continued)

*Primary Examiner* — Mussa A Shaawat
(74) *Attorney, Agent, or Firm* — Ingrassia Fisher & Lorenz, P.C.

(57) ABSTRACT

A stability enhancing system for a vehicle having a suspension system including a spring is disclosed herein. The stability enhancing system includes, but is not limited to, a processor that is mounted on the vehicle. A sensor is mounted on the vehicle and is communicatively coupled to the processor. The sensor is configured to detect a dynamic condition of the vehicle. A locking mechanism is connected to the spring and is communicatively coupled to the processor. The locking mechanism is configured to inhibit the spring from releasing a stored energy when the locking mechanism is locked. The processor is configured to obtain the dynamic condition from the sensor, to utilize the dynamic condition to determine whether a wheel lift event will occur, and to provide commands to the locking mechanism to lock if the processor determines that a wheel lift event will occur.

20 Claims, 7 Drawing Sheets

U.S. PATENT DOCUMENTS

| | | | |
|---|---|---|---|
| 7,051,851 B2 | 5/2006 | Svartz et al. | |
| 7,243,765 B2 | 7/2007 | Marcacci | |
| 7,261,303 B2 | 8/2007 | Stefan et al. | |
| 7,281,716 B2* | 10/2007 | Fanson | 280/5.52 |
| 7,440,844 B2* | 10/2008 | Barta et al. | 701/124 |
| 7,489,995 B2* | 2/2009 | Yasui et al. | 701/37 |
| 7,957,881 B2* | 6/2011 | Itoh | 701/90 |
| 7,997,588 B2* | 8/2011 | Ohnuma et al. | 280/5.519 |
| 8,075,002 B1* | 12/2011 | Pionke et al. | 280/5.5 |
| 8,251,383 B2* | 8/2012 | Dickie | 280/87.042 |
| 2001/0008986 A1* | 7/2001 | Brown et al. | 701/1 |
| 2003/0055549 A1* | 3/2003 | Barta et al. | 701/70 |
| 2004/0167701 A1* | 8/2004 | Mattson et al. | 701/71 |
| 2004/0200273 A1* | 10/2004 | Giustino et al. | 73/146 |
| 2004/0227320 A1* | 11/2004 | Platner et al. | 280/124.135 |
| 2004/0254703 A1* | 12/2004 | Traechtler et al. | 701/38 |
| 2005/0017462 A1* | 1/2005 | Kroppe | 280/5.507 |
| 2005/0098964 A1* | 5/2005 | Brown | 280/5.5 |
| 2005/0154509 A1* | 7/2005 | Schubert et al. | 701/29 |
| 2005/0154512 A1* | 7/2005 | Schubert et al. | 701/38 |
| 2005/0184475 A1* | 8/2005 | Hamm | 280/5.502 |
| 2005/0184476 A1* | 8/2005 | Hamm | 280/5.502 |
| 2005/0253350 A1* | 11/2005 | Suchta et al. | 280/124.106 |
| 2006/0030991 A1* | 2/2006 | Barta et al. | 701/70 |
| 2006/0163825 A1* | 7/2006 | Hamm | 280/5.502 |
| 2006/0175785 A1* | 8/2006 | Hamm | 280/124.106 |
| 2006/0249919 A1* | 11/2006 | Suzuki et al. | 280/5.511 |
| 2007/0176375 A1* | 8/2007 | Barth et al. | 280/5.5 |
| 2007/0299577 A1* | 12/2007 | Hattori et al. | 701/32 |
| 2008/0120005 A1* | 5/2008 | Lu et al. | 701/70 |
| 2008/0129000 A1* | 6/2008 | Munday et al. | 280/5.502 |
| 2008/0309030 A1* | 12/2008 | Hall et al. | 280/5.502 |
| 2009/0012688 A1* | 1/2009 | Hattori et al. | 701/79 |
| 2009/0101428 A1* | 4/2009 | Itoh | 180/197 |
| 2010/0191423 A1* | 7/2010 | Koyama et al. | 701/42 |
| 2011/0025000 A1* | 2/2011 | Inoue et al. | 280/5.507 |

OTHER PUBLICATIONS

China Patent & Trademark Office, Office Action for Chinese Patent Application No. 201110131759.X, mailed Apr. 22, 2013.

\* cited by examiner

STABILITY ENHANCING SYSTEM AND METHOD FOR ENHANCING THE STABILITY OF A VEHICLE

TECHNICAL FIELD

The technical field generally relates to vehicles, and more particularly relates to systems and methods for enhancing the stability of vehicle.

BACKGROUND

A typical automobile has four wheels and a suspension system wherein the body of the automobile is supported on each wheel by a spring. During a turning maneuver of the automobile, the wheels of the automobile fall into one of two groups—the wheels are either leading wheels or trailing wheels. The leading wheels are the wheels located on the outer radius of the turn and the trailing wheels are the wheels located in the inner radius of the turn.

As an automobile enters a turn, the body of the automobile begins to lean away from the direction of the turn. For example, during a right hand turn, the body of the automobile will lean to the left. Such leaning increases the force acting on the springs of the leading wheels causing them to compress and store energy.

Such leaning has the opposite effect on the springs of the trailing wheels. The leaning of the body towards the leading wheels reduces the weight resting on the springs of the trailing wheels, allowing them to expand and release some or all of the energy that they had been storing, depending upon the dynamics of the turn (i.e., the speed, the angle of direction change, etc.). This release of the energy contributes to the forces already acting on the vehicle, such as centrifugal force, gravity, and other dynamic forces, and can cause the trailing wheels to lift off of the ground (referred to herein as a "wheel lift" event).

In the past, various solutions have been adopted to inhibit the occurrence of a wheel lift event. For example, some automobiles are equipped with a system that is designed to automatically apply the brakes to only some the vehicle's wheels when a dynamic condition is detected that will induce yaw instabilities that can potentially lead to a wheel lift event. Such braking systems apply a yaw-inducing torque to the automobile to counteract certain body motions which, if left unchecked, could potentially cause the trailing wheels to lift. Other automobiles have been equipped with anti-roll bars whose stiffness can be increased automatically when a dynamic condition that will lead to a large body roll is detected. At that time, the stiffness of the anti-roll bars is increased and body lean is diminished. While these solutions are adequate in reducing the yaw instabilities and body roll during a turn event, there is room for improvement in direct roll control of the whole vehicle.

SUMMARY

Embodiments of stability enhancing systems and methods for enhancing the stability of a vehicle are disclosed herein.

In an embodiment, a stability enhancing system for a vehicle having a suspension system including a spring, includes, but is not limited to, a processor mounted on the vehicle. A sensor is mounted on the vehicle and is communicatively coupled to the processor. The sensor is configured to detect a dynamic condition of the vehicle. A locking mechanism is connected to the spring and is communicatively coupled to the processor. The locking mechanism is configured to inhibit the spring from releasing a stored energy when the locking mechanism is locked. The processor is configured to obtain the dynamic condition from the sensor, to utilize the dynamic condition to determine whether a wheel lift event will occur, and to provide a lock command to the locking mechanism if the processor determines that a wheel lift event will occur.

In another embodiment, a stability enhancing system for a vehicle having a suspension system including a spring, includes, but is not limited to, a processor mounted on the vehicle. A sensor is mounted on the vehicle and is communicatively coupled to the processor. The sensor is configured to detect a dynamic condition of the vehicle. A data storage unit is communicatively coupled to the processor. The data storage unit is configured to store data relating a wheel-lift-threshold dynamic condition. A locking mechanism is connected to the spring and is communicatively coupled to the processor. The locking mechanism is configured to inhibit the spring from releasing a stored energy when the locking mechanism is locked. The processor is configured to obtain the dynamic condition from the sensor, to obtain the wheel-lift-threshold dynamic condition from the data storage unit, to compare the dynamic condition with the wheel-lift-threshold dynamic condition, and to provide a lock command to the locking mechanism if the processor determines that the dynamic condition is greater than the wheel-lift-threshold dynamic condition.

In another embodiment, a method for enhancing the stability of a vehicle having a suspension system including a spring, includes, but is not limited to, the steps of detecting a dynamic condition of the vehicle with a sensor, determining whether the dynamic condition will cause the occurrence of a wheel lift event with a processor, and inhibiting the spring from releasing a stored energy if it is determined that the wheel lift event will occur.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved stability enhancing system and method for enhancing the stability of a vehicle is disclosed herein. A locking mechanism is attached to a spring of the suspension system at some or all of the wheels of the vehicle. The locking mechanism is capable of being locked very quickly, in some examples, within milliseconds, and, in turn, prevents the spring from expanding or otherwise releasing its stored energy.

A sensor is mounted to the vehicle and is configured to detect a dynamic condition of the vehicle. As used herein, the term "dynamic condition" refers to vehicle motion including motion of the vehicle with respect to a road surface and motion of the vehicle body with respect to the vehicle's wheels. Some examples include the vehicle's lateral acceleration, angular acceleration and its lean or roll rate. A processor on board the vehicle receives the dynamic condition from the sensor and is configured to determine whether the dynamic condition will cause a wheel lift event. If the processor determines that a wheel lift event will occur, the processor transmits a lock command to the locking mechanism or mechanisms associated with the trailing wheels of the vehicle, causing the locking mechanisms to lock. When locked, each locking mechanism inhibits a respective spring of the trailing wheels from releasing their stored energy. This action eliminates one component of the various forces and moments that typically combine to cause a wheel lift event and therefore reduces the likelihood of a wheel lift event.

A further understanding of the systems and methods for enhancing the stability of a vehicle described above may be obtained through a review of the illustrations accompanying this application together with a review of the detailed description that follows.

Figure 1A:
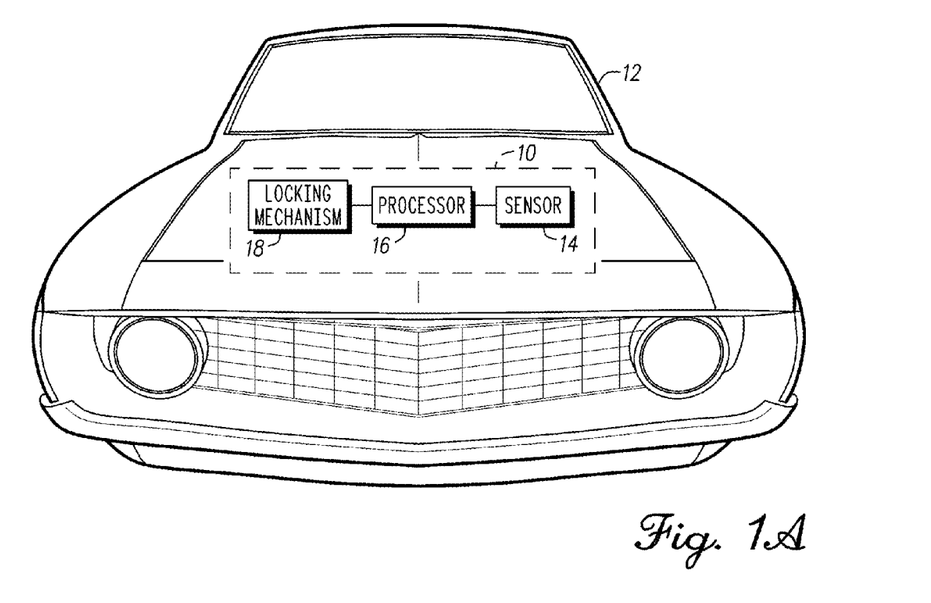
FIG. 1A is a schematic view illustrating an embodiment of a stability enhancing system installed on a vehicle having a suspension system including a spring.

FIG. 1A is a schematic view illustrating an embodiment of a stability enhancing system (hereinafter "system 10") installed on a vehicle 12 having a suspension system including a spring. Vehicle 12 is an automobile having four wheels and a suspension system that includes a spring associated with each wheel. Each spring supports a portion of the body of the automobile. Vehicle 12 may be any type of automobile including, without limitation, sedans, coupes, mini-vans, full-size vans, pickup trucks, sport utility vehicles, crossover utility vehicles, busses, tractor trailers, recreational vehicles, hatch-backs and station wagons. Additionally, although the discussion herein centers around automobiles, it should be understood that the teachings herein are equally applicable to any ground based vehicle having a suspension system that includes a spring(s) including, but not limited to, trams, trolleys, and railway trains.

System 10 includes a sensor 14, a processor 16, and a locking mechanism 18. In other embodiments, system 10 may include additional components, such as, but not limited to multiple sensors 14 and/or multiple types of sensors.

Sensor 14 may be any type of sensor configured to detect a dynamic condition of vehicle 12 that is indicative of whether or not vehicle 12 will experience a wheel lift event. In some embodiments, sensor 14 may be configured to continuously or periodically monitor a specific dynamic condition of vehicle 12 and to continuously or periodically provide the dynamic condition to another onboard component. In other embodiments, sensor 14 may be configured to sense and to provide the dynamic condition to another onboard component only in response to a request from another onboard component.

In some embodiments, sensor 14 may be a triaxial accelerometer configured to determine the rotational acceleration from a vertical orientation for vehicle 12'. An exemplary triaxial accelerometer compatible for use with system 10 is manufactured by PCB Piezotronics, Inc (www.pcb.com) and sold under the model number 356A17.

In other embodiments, sensor 14 may be a roll angle sensor configured to determine the roll angle or role rate of vehicle 12'. An exemplary roll angle sensor compatible for use with system 10 is manufactured by MicroStrain Inc. (www.microstrain.com) and sold under the model number 3DM-GX2.

Locking mechanism 18 may be any apparatus that is adapted for connection to the spring of a vehicle's suspension system and that is configured to selectively lock in a manner that inhibits the spring from expanding or from otherwise releasing energy that is stored in the spring. In some embodiments, locking mechanism 18 is configured to remain in an unlocked state until it receives a locking command from processor 16, as discussed below. In some embodiments, locking mechanism 18, when in an unlocked state, is configured to expand and contract with little or no resistance to the expansion and compression of the suspension spring to which it is connected. This permits normal operation of the suspension spring without interference from the locking mechanism.

One exemplary locking mechanism is a magneto rheological lock which utilizes magneto rheological fluid. A magneto rheological (MR) fluid is a fluid with micron-sized magnetic particles that is configured to change viscosity almost instantaneously when subjected to a magnetic field. A typical MR fluid in the absence of a magnetic field has a readily measurable viscosity that is a function of its fluid components and particle composition, particle size, the particle loading, temperature and the like. However, in the presence of an applied magnetic field, the suspended particles appear to align or cluster and the fluid drastically thickens or gels. Its effective viscosity then is very high and a larger force, termed a yield stress, is required to promote flow in the fluid. The viscosity of the MR fluid increases to the point of becoming a viscoelastic solid by application of magnetic fields.

MR fluids exhibit an ability to change their rheology, and thus their flow characteristics, by several orders of magnitude in a timeframe on the order of milliseconds under the influence of an applied magnetic field. The induced rheological changes are completely reversible and, hence, can be utilized in devices that respond to the changes in the magnetic field environment. With respect to automotive applications, such materials are seen as a useful working media in shock absorbers, for controllable suspension systems, vibration dampers in controllable powertrain and engine mounts and in numerous electronically controlled force/torque transfer (clutch) devices. Such systems are discussed in U.S. Publication No. 2005/0253350, submitted by Suchta, et al., and which is hereby incorporated herein in its entirety.

In another example, locking mechanism 18 may be an electro-hydraulic lock. In some embodiments, an electro-hydraulic lock includes a rod mounted within a cylinder. The rod displaces hydraulic fluid as the rod moves through the cylinder. The displaced hydraulic fluid flows into an overflow reservoir through electronically actuated valves. When the valves are open, the rod is free to move in and out of the cylinder. When the valves are closed, however, movement of the rod is impeded. An exemplary electro-hydraulic lock is manufactured by TRW Automotive Holdings Corporation under the trade name SARC-AP1 Actuator.

Processor 16 may be any type of computer, computer system, or microprocessor that is configured to perform algorithms, to execute software applications, to execute sub-routines and/or to be loaded with and to execute any other type of computer program. Processor 16 may comprise a single processor or a plurality of processors acting in concert. In some embodiments, processor 16 may be dedicated for use exclusively with system 10 while in other embodiments processor 16 may be shared with other systems onboard vehicle 12. In still other embodiments, processor 16 may be combined with any of the other components of system 10, such as, but not limed to, sensor 14 and/or locking mechanism 18.

Processor 16 is communicatively coupled to both sensor 14 and locking mechanism 18. Such coupling may be effected through the use of any suitable means of transmission including both wired and wireless connections. For example, each component may be physically connected to processor 16 via a coaxial cable or via any other type of wire connection effective to convey electronic signals. In the illustrated embodiment, processor 16 is directly communicatively coupled to each of the other components. In other embodiments, each component may be communicatively connected to processor 16 across a vehicle bus or additional intervening components may be disposed between processor 16, sensor 14 and locking mechanism 18. In still other examples, each component may be coupled wirelessly to processor 16 via any wireless connection effective to communicate signals between components. Examples of suitable wireless connections include, but are not limited to, a Bluetooth connection, a WiFi connection, an infrared connection or the like.

Being communicatively coupled provides a pathway for the transmission of commands, instructions, interrogations, and other signals between processor 16 and each of the other components. Through this communicative coupling, processor 16 may control and/or communicate with each of the other components. Each of the other components discussed above are configured to interface and engage with processor 16. For example, sensor 14 is configured to provide the dynamic condition to processor 16 and locking mechanism 18 is configured to receive lock and/or unlock commands from processor 16 and to lock and/or unlock when such commands are received.

In an embodiment, processor 16 is configured to interact with, coordinate with, and/or orchestrate the activities of each of the other components of system 10 for the purpose of inhibiting the occurrence of a wheel lift event. Processor 16 is programmed and/or otherwise configured to obtain the dynamic condition from sensor 14. Processor 16 is further configured to utilize the dynamic condition to calculate whether a wheel lift event is imminent.

In some embodiments, the determination that a wheel lift event is imminent may be based solely on information provided by sensor 14, while in other embodiments, processor 16 may rely on additional information. For example, other sensors onboard vehicle 12 may provide other information that is relevant to the determination of whether or not a wheel lift event is imminent. For instance, processor 16 may obtain load information from sensors associated with the suspension system, vehicle speed information from the speedometer, and the steering wheel angle from a sensor on the steering wheel. These and other factors may impact or be predictive of when a wheel lift event is imminent.

Once processor 16 has determined that a wheel lift event is imminent, processor 16 sends a lock command to one or more locking mechanisms 18 associated with the trailing wheels of vehicle 12. In response, locking mechanisms 18 enter a locked condition whereby the release of energy stored in the associated spring is inhibited. For example, in a case where locking mechanism 18 receives the locking command while its associated spring is in a compressed state, locking mechanism 18 will inhibit the spring from expanding. This prevents the spring from releasing the energy stored in its coils which, if allowed to expand, could cause the trailing wheels of vehicle 12 to lift off of the ground. The time period beginning with detection of the dynamic condition by sensor 14 and ending with the locking of locking mechanism 18 is preferably very short. In some examples, the process may take between 20 and 30 milliseconds.

Once locking mechanism 18 is locked, it is configured to remain locked until processor 16 (or some other component) sends an unlock command. In some embodiments, processor 16 may be configured to maintain locking mechanism 18 in a locked state until a predetermined period of time has lapsed. Once the predetermined period of time has lapsed, processor 16 automatically sends an unlock command to locking mechanism 18 and the associated springs are allowed to expand. In other embodiments, processor 16 may be configured to send the unlock command to locking mechanism 18 only when processor 16 determines that a wheel lift event is no longer imminent based on the dynamic condition reported by sensor 14. In some embodiments, locking mechanism 18 may need to be unlocked by a trained service technician at a vehicle service center.

Figure 1B:
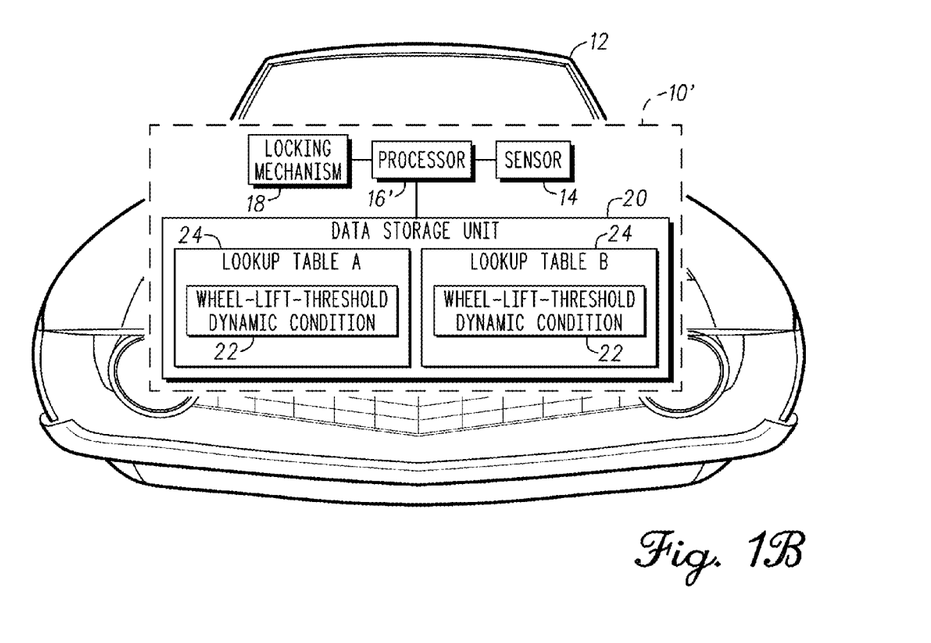
FIG. 1B is a schematic view illustrating another embodiment of a stability enhancing system installed on a vehicle having a suspension system including a spring.

FIG. 1B is a schematic view illustrating an embodiment of another stability enhancing system (hereinafter referred to as "system 10'"), installed on vehicle 12 having a suspension system including a spring. System 10' includes sensor 14, locking mechanism 18, processor 16' and data storage unit 20. Sensor 14 and locking mechanism 18 are identical to the corresponding components described above with respect to system 10.

Data storage unit 20 may be any type of electronic, magnetic, and/or optical memory device that is configured to store data. For example, data storage unit 20 may include, without limitation, non-volatile memory, disk drives, tape drives, and mass storage devices and may include any suitable software, algorithms and/or sub-routines that provide the data storage component with the capability to store, organize, and permit retrieval of data. In some embodiments, data storage unit 20 may comprise only a single component. In other embodiments, data storage unit 20 may comprise a plurality of components acting in concert. In some embodiments, data storage unit 20 may be dedicated for use exclusively with system 10', while in other embodiments, data storage unit 20 may be shared with other systems onboard vehicle 12.

In the embodiment illustrated in FIG. 1B, data storage unit 20 is configured to store one or more wheel-lift-threshold dynamic conditions 22 associated with vehicle 12. A wheel-lift-threshold dynamic condition is a dynamic condition beyond which vehicle 12 will experience a wheel lift event. For example, if vehicle 12 will experience a wheel lift event when the rate of roll exceeds ten degrees per second, then vehicle 12's wheel-lift-threshold dynamic condition is ten degrees per second. The wheel-lift-threshold dynamic condition may change depending upon other circumstances and conditions experienced by vehicle 12. For example, the wheel-lift-threshold dynamic condition may vary with the speed of vehicle 12, with the angle at which the steering wheel is turned, with the initial roll angle at which vehicle 12 was oriented, with the grade of the road on which vehicle 12 is situated, etc. . . .

Additionally, vehicle 12 may have multiple types of sensors 14, with each such sensor 14 measuring and/or detecting a different dynamic condition of vehicle 12. Vehicle 12 will have a different wheel-lift-threshold dynamic condition associated with each different dynamic condition and each different wheel-lift-threshold dynamic condition will vary with the circumstances and conditions as discussed above. Each of these variables and conditions can be determined in a laboratory environment and the results can be stored in a lookup table format on data storage unit 20. Data storage unit 20 may store a plurality of lookup tables 24, each associated with a different dynamic condition. In the embodiment illustrated in FIG. 1B, data storage unit 20 is communicatively coupled to processor 16' and is configured to receive and respond to commands from processor 16' demanding the production of dynamic conditions and/or other data.

Processor 16' is configured to obtain the dynamic condition from sensor 14, to retrieve a corresponding wheel-lift-threshold dynamic condition from data storage unit 20, and to compare the dynamic condition with the wheel-lift-threshold dynamic condition. When processor 16' determines that the dynamic condition exceeds the wheel-lift-threshold dynamic condition, then processor 16' sends a lock command to the locking mechanisms 18 that are associated with the trailing wheels of vehicle 12 in the manner described above.

Once locking mechanisms 18 are locked, they remain locked until processor 16' (or some other component) sends an unlock command. In some embodiments, processor 16' may be configured to maintain locking mechanism 18 in a locked state until a predetermined period of time has lapsed. Once the predetermined period of time has lapsed, processor 16' automatically sends an unlock command to locking mechanism 18 and the associated springs are allowed to expand. In other embodiments, processor 16' may be configured to send the unlock command to locking mechanism 18 only when processor 16 determines that the dynamic condition reported by sensor 14 falls below wheel-lift-threshold dynamic condition 22. In some embodiments, locking mechanism 18 may need to be unlocked by a trained service technician at a vehicle service center.

Figure 2:
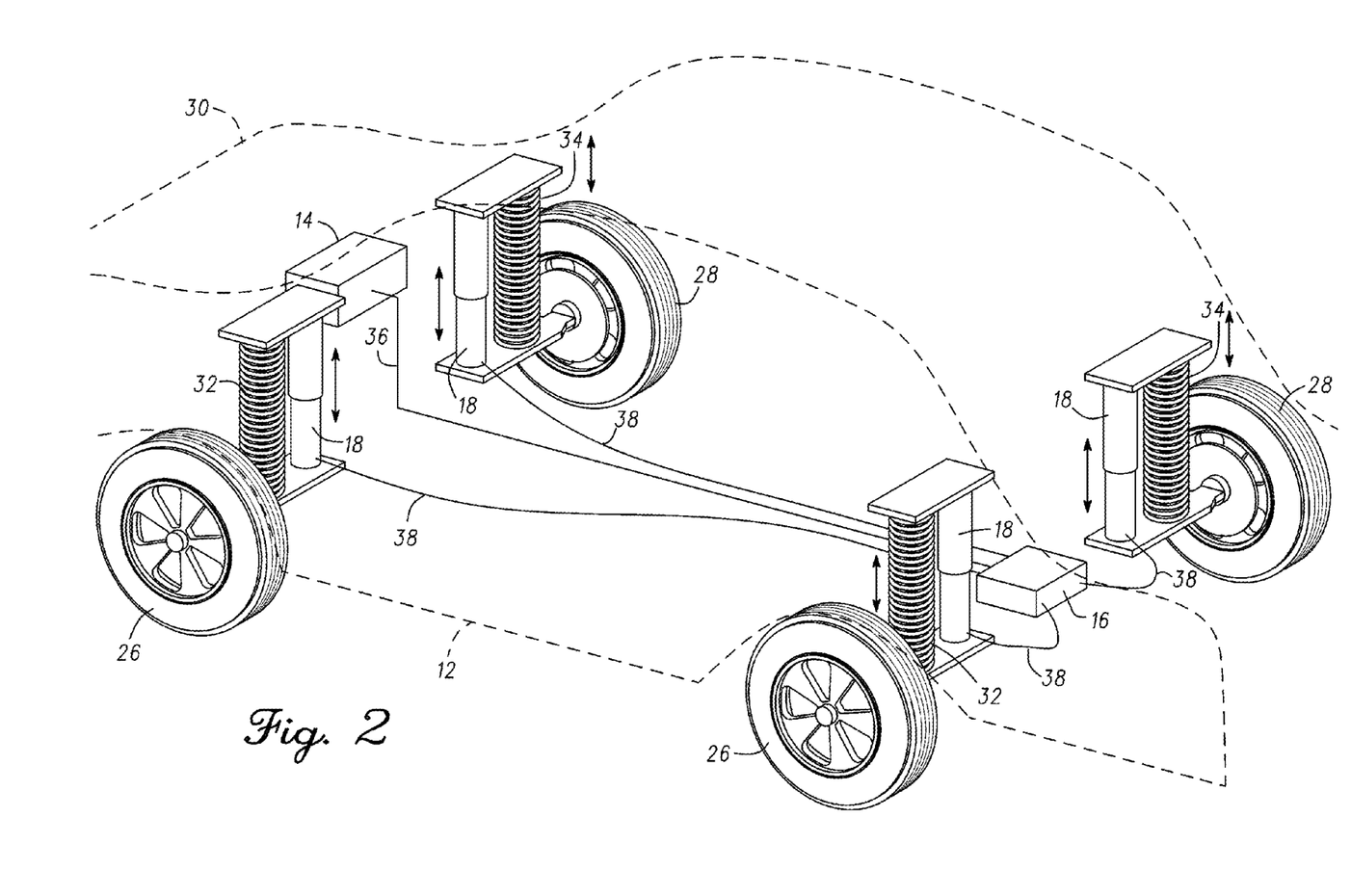
FIG. 2 is a perspective view illustrating a simplified suspension system including a plurality of locking mechanisms for a vehicle.

FIG. 2 is a perspective view illustrating a simplified suspension system including a plurality of locking mechanisms 18 for vehicle 12 of FIG. 1. Vehicle 12 includes passenger side wheels 26 and driver side wheels 28. Vehicle body 30 is supported on passenger side wheels 26 and on driver side wheels 28 by passenger side springs 32 and driver side springs 34, respectively. Other components, such as shock absorbers and anti-roll bars that are typically included in a suspension system, have been eliminated for the sake of simplifying the illustration.

Locking mechanisms 18 are aligned with, and attached to, passenger side springs 32 and driver side springs 34. While locking mechanisms 18 are in an unlocked condition, they will extend and contract as their associated springs compress and expand. In the illustrated embodiment, sensor 14 is positioned at a rear portion of vehicle 12. In other embodiments, sensor 14 may be located at any suitable location on vehicle 12. Processor 16 is located at a front portion of vehicle 12 and is connected to sensor 14 via coaxial cable 36. Processor 16 is also connected to each locking mechanism 18 via coaxial cable 38.

Figure 3:
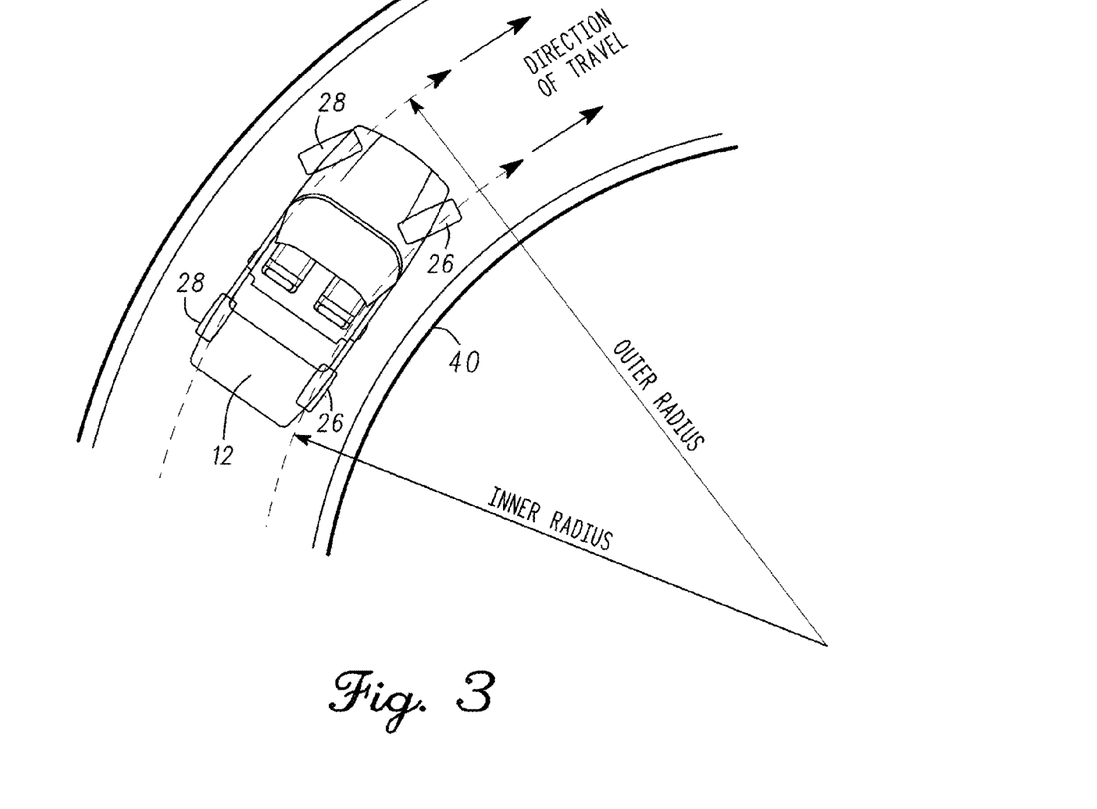
FIG. 3 is a plan view of the vehicle of FIG. 2 engaging in a maneuver that can result in a wheel lift event.

FIG. 3 is a plan view of vehicle 12 of FIG. 2 engaging in an exemplary maneuver that, without intervention, will induce a wheel lift event. With continued reference to FIGS. 1 and 2, and as illustrated in FIG. 3, vehicle 12 has entered a sharp, right hand turn 40. Vehicle 12's front wheels have turned sharply to the right and vehicle 12 is experiencing a dynamic condition that will lead to a wheel lift event. In this example, passenger side wheels 26 are the trailing wheels and driver side wheels 28 are the leading wheels. If vehicle 12 is not equipped with system 10 or 10', then as vehicle 12 rolls to the left and the weight resting on passenger side springs 32 correspondingly diminishes, passenger side springs 32 will release their stored energy and expand. This will push passenger side wheels 26 off of the ground.

Figure 4:
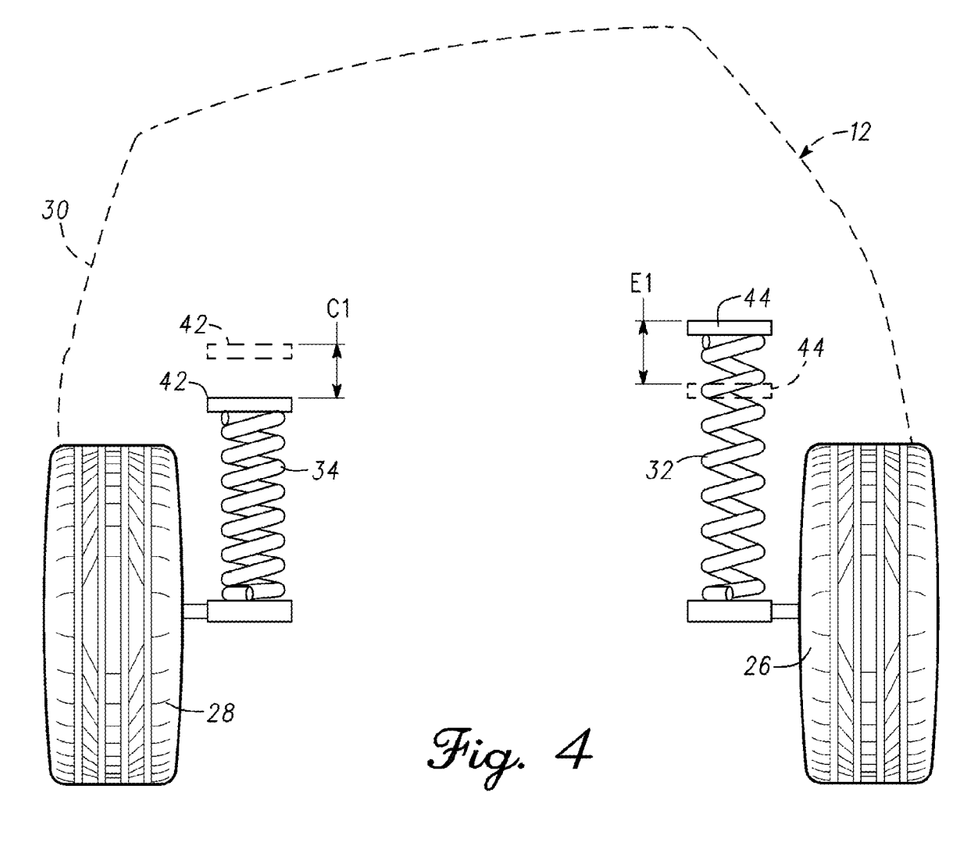
FIG. 4 is a simplified front view illustrating the suspension system of FIG. 2 without locking mechanisms during the maneuver illustrated in FIG. 3.

FIG. 4 is a simplified front view illustrating the suspension system of FIG. 2 without locking mechanisms 18 during the maneuver illustrated in FIG. 3. As illustrated, vehicle body 30 has leaned to the left. As it leans, an upper portion 42 of driver side spring 34 compresses from an initial position to a compressed position by a distance indicated by arrow C1. At the same time, an upper portion 44 of passenger side spring 32 expands from an initial position to an expanded position by a distance indicated by arrow E1. This expansion of passenger side springs 32 has the effect of pushing up on vehicle body 30 and precipitating the wheel lift event.

Figure 5:
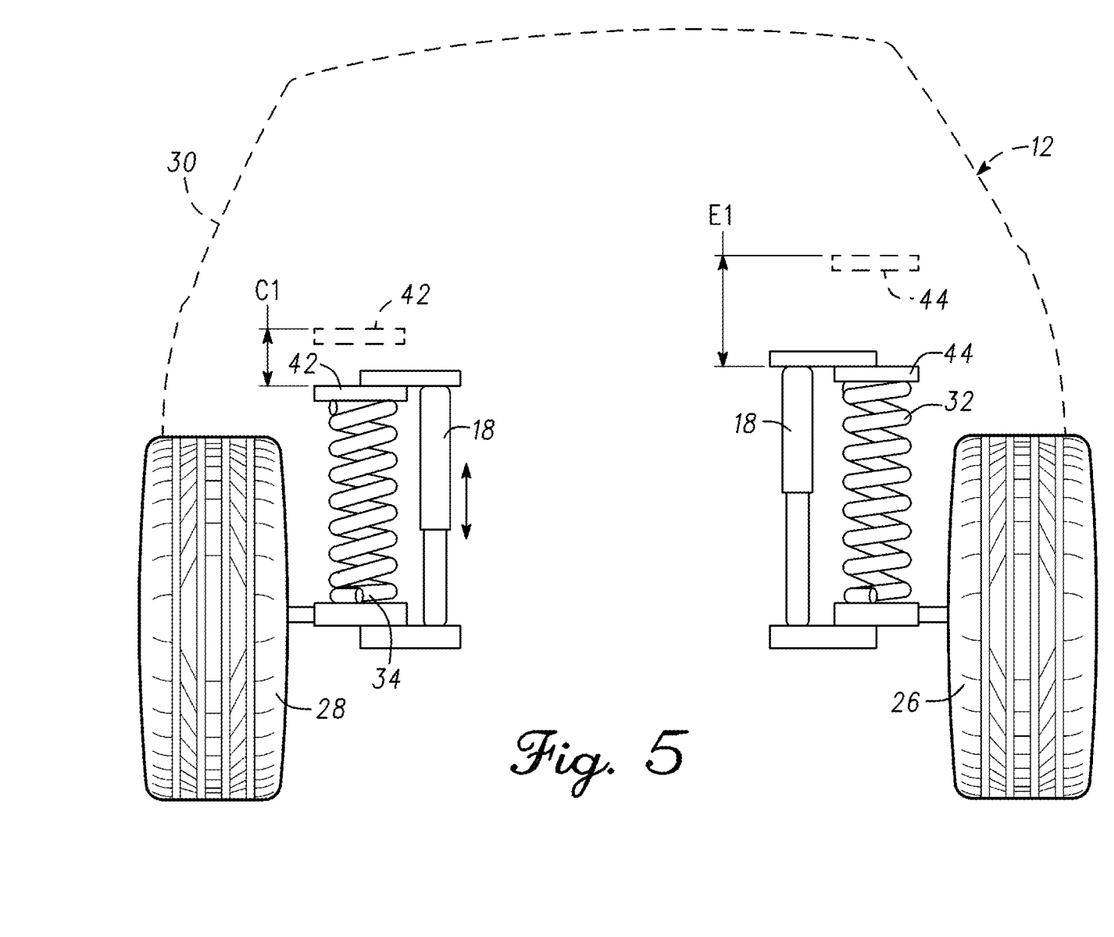
FIG. 5 is a simplified front view illustrating the suspension system of FIG. 2 equipped with locking mechanisms during the maneuver illustrated in FIG. 3.

FIG. 5 is a simplified front view illustrating the suspension system of FIG. 2 equipped with locking mechanisms 18 during the maneuver illustrated in FIG. 3. With continued reference to FIGS. 1-4, the locking mechanism 18 connected to passenger side spring 32 has received the lock command from processor 16. Accordingly, upper portion 44 of passenger side spring 32 is inhibited by locking mechanism 13 from expanding by the distance E1. Accordingly, the roll angle of vehicle body 30 is less severe than that shown in FIG. 4. Additionally, the upwardly directed force exerted by passenger side spring 32 on vehicle body 30 is constrained by locking mechanism 18 to prevent precipitation of the wheel lift event.

Figure 6:
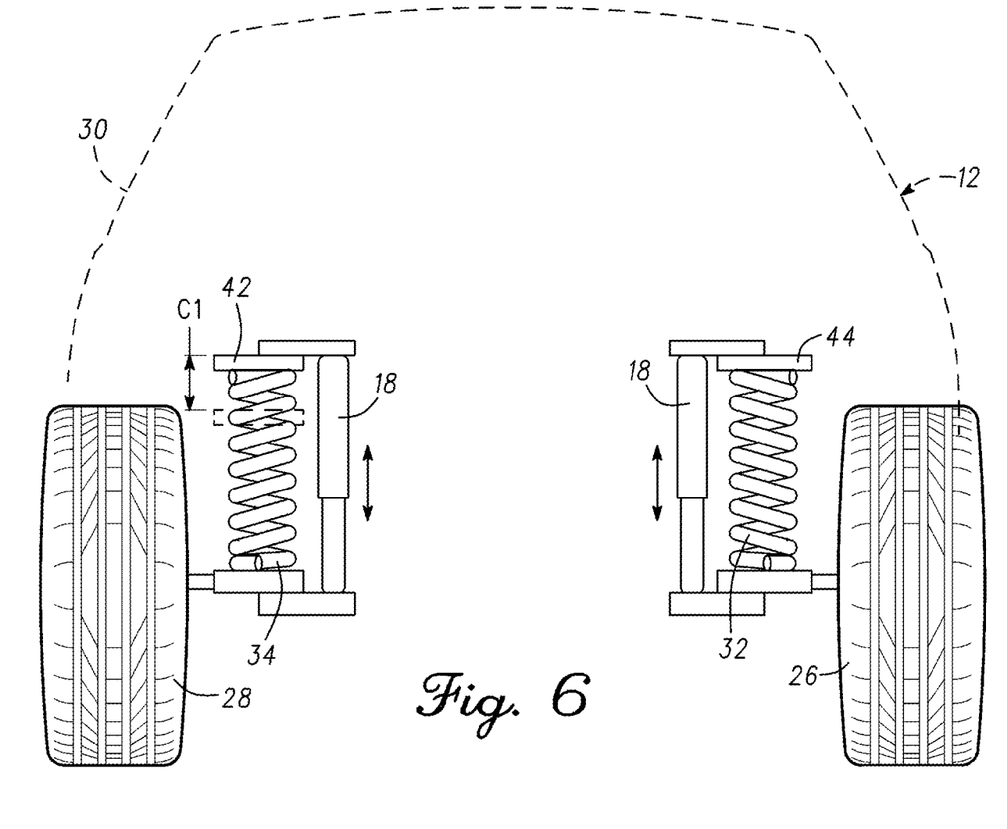
FIG. 6 is a simplified front view illustrating the suspension system of FIG. 5 subsequent to execution of the maneuver illustrated in FIG. 3.

FIG. 6 is a simplified front view illustrating the suspension system of FIG. 5 subsequent to execution of the maneuver illustrated in FIG. 3. Vehicle 12 has completed the right hand turn illustrated in FIG. 3 and has resumed driving straight ahead. Upper portion 42 of driver side spring 34 has expanded by a distance C1 to return to its initial position and vehicle body 30 has returned to a level orientation. With continued reference to FIGS. 1-2, sensor 14 detects the current dynamic condition and provides that current dynamic condition to processor 16. Processor 16 utilizes the current dynamic condition to determine that a wheel lift event is not imminent. After making this determination, processor 16 sends an unlock command to locking mechanism 18, thus permitting passenger side spring 32 to freely expand and compress.

Figure 7:
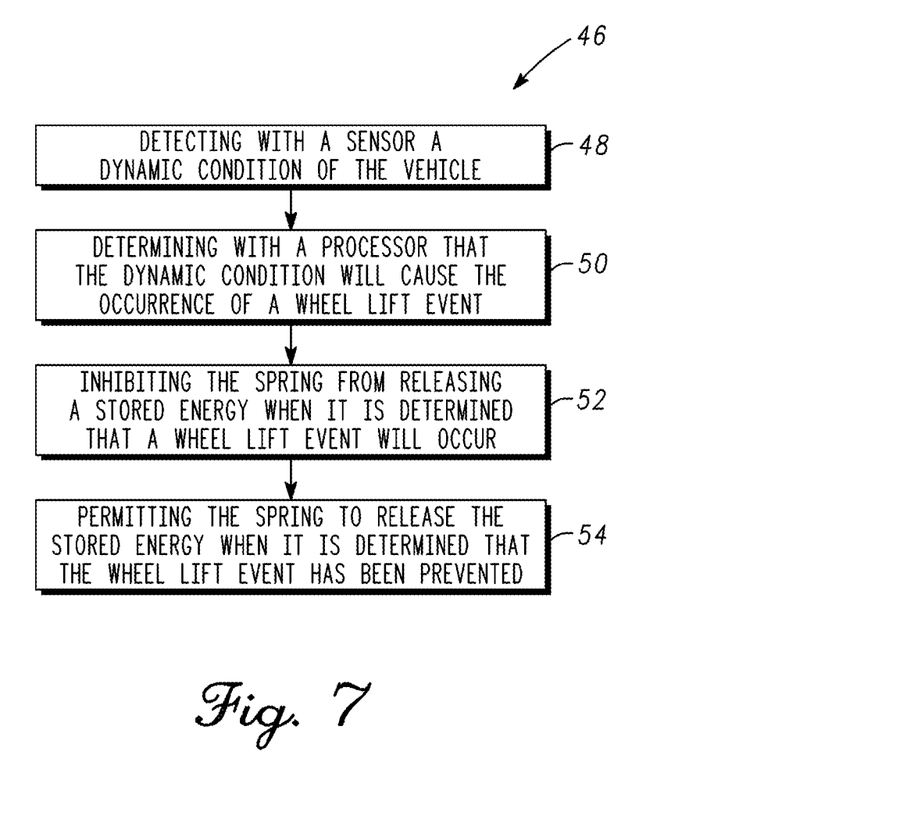
FIG. 7 is a block diagram illustrating the steps of a method for enhancing the stability of a vehicle.

FIG. 7 is a block diagram illustrating the steps of a method 46 for enhancing the stability of a vehicle. At block 48, a sensor is used to detect a dynamic condition of a vehicle. The sensor may be a three-axis accelerometer, a roll angle sensor, a roll rate detector, or a sensor configured to detect any other dynamic condition of a vehicle which may be used to determine whether a wheel lift event will occur.

At block 50, a processor onboard the vehicle is used to determine whether a wheel lift event will occur. The processor utilizes the dynamic condition provided by the sensor to make this determination. In some embodiments of method 46, the processor may be configured to calculate whether a wheel lift event will occur. In other embodiments of method 46, the processor may be configured to utilize data stored in a data storage unit (e.g., information stored in a look-up table) to determine whether a wheel lift event will occur.

At block 52, once it has been determined that a wheel lift event is imminent, the spring or springs associated with the trailing wheels are inhibited from releasing their stored energy. In some examples, this may be accomplished by the processor sending a lock command to a locking mechanism associated with the springs of the trailing wheels which would have the effect of inhibiting the springs of the trailing wheels from expanding.

At block 54, after the wheel lift event has been prevented, the springs of the trailing wheels are permitted to release their stored energy. In some embodiments, a new dynamic condition of the vehicle is sensed by the sensor and provided to the processor. The processor utilizes the new dynamic condition of the vehicle to determine that a wheel lift event is no longer imminent. Upon making this determination, the processor sends a command to the locking mechanism instructing it to unlock.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A stability enhancing system for a vehicle having a suspension system including a spring, the stability enhancing system comprising:
    a processor mounted on the vehicle;
    a sensor mounted on the vehicle and communicatively coupled to the processor, the sensor configured to detect a dynamic condition of the vehicle;
    a locking mechanism having an upper portion and a lower portion each directly connected to the spring and communicatively coupled to the processor, the locking mechanism being configured to inhibit the spring from releasing a stored energy when the locking mechanism is locked,
    wherein the processor is configured to obtain the dynamic condition from the sensor, to utilize the dynamic condition to determine whether a wheel lift event will occur, and to provide a lock command to the locking mechanism if the processor determines that the wheel lift event will occur.

2. The stability enhancing system of claim 1, wherein the locking mechanism comprises a magneto rheological fluid lock.

3. The stability enhancing system of claim 1, wherein the locking mechanism comprises an electro-hydraulic lock.

4. The stability enhancing system of claim 1, wherein the vehicle comprises a plurality of wheels, the suspension system comprising a corresponding plurality of the springs, wherein each wheel is associated with one of the springs, the stability enhancing system further comprising a plurality of the locking mechanisms, wherein each of the locking mechanisms is connected to a respective one of the springs such that each of the wheels is associated with one of the locking mechanisms.

5. The stability enhancing system of claim 4, wherein the processor is further configured to provide the lock command to a subset of the plurality of the locking mechanisms prior to the wheel lift event if the processor determines that the wheel lift event will occur, the subset consisting of each of the locking mechanisms that is associated with a trailing wheel.

6. The stability enhancing system of claim 1, wherein the sensor comprises a three-axis accelerometer.

7. The stability enhancing system of claim 1, wherein the sensor comprises a roll angle sensor.

8. The stability enhancing system of claim 1, wherein the locking mechanism is further configured to permit the spring to release the stored energy when the locking mechanism is unlocked, and wherein the processor is further configured to provide an unlock command to the locking mechanism if the processor determines that such release of the stored energy will not cause the wheel lift event.

9. The stability enhancing system of claim 1, wherein the spring is a compression spring and wherein the locking mechanism is configured to obstruct expansion of the spring when the locking mechanism is locked.

10. A stability enhancing system for a vehicle having a suspension system including a spring, the stability enhancing system comprising:
    a processor mounted on the vehicle;
    a sensor mounted on the vehicle and communicatively coupled to the processor, the sensor configured to detect a dynamic condition of the vehicle;
    a data storage unit communicatively coupled to the processor, the data storage unit configured to store data relating a wheel-lift-threshold dynamic condition;
    a locking mechanism having an upper portion and a lower portion each directly connected to the spring and communicatively coupled to the processor, the locking mechanism being configured to inhibit the spring from releasing a stored energy when the locking mechanism is locked,
    wherein the processor is configured to obtain the dynamic condition from the sensor, to obtain the wheel-lift-threshold dynamic condition from the data storage unit, to compare the dynamic condition with the wheel-lift-threshold dynamic condition, and to provide a command to the locking mechanism to lock when the processor determines that the dynamic condition is greater than the wheel-lift-threshold dynamic condition.

11. The stability enhancing system of claim 10, wherein the locking mechanism comprises a magneto rheological fluid lock.

12. The stability enhancing system of claim 10, wherein the locking mechanism comprises an electro-hydraulic lock.

13. The stability enhancing system of claim 10, wherein the vehicle comprises a plurality of wheels, the suspension system comprising a corresponding plurality of the springs, wherein each wheel is associated with one of the springs, the stability enhancing system further comprising a plurality of the locking mechanisms, wherein each of the locking mechanisms is connected to a respective one of the springs such that each wheel is associated one of the locking mechanisms.

14. The stability enhancing system of claim 13, wherein the processor is further configured to provide the command to a subset of the plurality of the locking mechanisms to lock prior to a wheel lift event if the processor determines that the wheel lift event will occur, the subset consisting of each of the locking mechanisms that is associated with a trailing wheel.

15. The stability enhancing system of claim 10, wherein the sensor comprises a three-axis accelerometer.

16. The stability enhancing system of claim 10, wherein the sensor comprises a roll angle sensor.

17. The stability enhancing system of claim 10, wherein the locking mechanism is further configured to permit the spring to release the stored energy when the locking mechanism is unlocked, and wherein the processor is further configured to provide an unlock command to the locking mechanism when the processor determines that the dynamic condition has diminished to less than the wheel-lift-threshold dynamic condition.

18. The stability enhancing system of claim 10, wherein the spring is a compression spring and wherein the locking mechanism is configured to obstruct expansion of the spring when the locking mechanism is locked.

19. A method for enhancing the stability of a vehicle having a suspension system including a spring, the method comprising:
- detecting a dynamic condition of the vehicle with a sensor;
- determining if the dynamic condition will cause an occurrence of a wheel lift event with a processor; and
- directly inhibiting the spring from releasing a stored energy with a locking mechanism having an upper portion and a lower portion each directly connected to the spring if it is determined that the wheel lift event will occur.

20. The method of claim 19, further comprising:
- permitting the spring to release the stored energy when it is determined that the wheel lift event has been prevented.

* * * * *